(12) United States Patent
Korein et al.

(10) Patent No.: US 6,226,035 B1
(45) Date of Patent: *May 1, 2001

(54) ADJUSTABLE IMAGING SYSTEM WITH WIDE ANGLE CAPABILITY

(75) Inventors: James Korein, Chappaqua; Shree K. Nayar; L. Clayton Yaseen, II, both of New York, all of NY (US); Venkata N. Peri, Jersey City, NJ (US)

(73) Assignee: Cyclo Vision Technologies, Inc., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/034,208

(22) Filed: Mar. 4, 1998

(51) Int. Cl.[7] ............................. G02B 13/00; G02B 13/16
(52) U.S. Cl. ............................. 348/335; 348/36; 348/373
(58) Field of Search ................................. 348/335, 211, 348/36, 37, 38, 39, 207, 373, 143; 353/30, 98, 99; 352/69, 70

(56) References Cited

U.S. PATENT DOCUMENTS

| | | |
|---|---|---|
| 3,505,465 | 4/1970 | Rees . |
| 3,740,469 * | 6/1973 | Herndon .................. 348/36 |
| 5,023,725 * | 6/1991 | McCutchen ............. 348/38 |
| 5,164,827 | 11/1992 | Paff . |
| 5,185,667 | 2/1993 | Zimmerman . |
| 5,187,571 * | 2/1993 | Braun et al. ............. 348/39 |

(List continued on next page.)

OTHER PUBLICATIONS

"Map–based Navigation for a Mobile Robot with Omnidirectional Image Sensor COPIS", by Yasushi Yagi et al., Transactions on Robotics and Automation, vol. 11, No. 5, Oct. 1995, pp. 20–34.

"Obstacle Detection with Omnidirectional Image Sensor HyperOmni Vision", by Yamazawa et al., International Conference on Robotics and Automation, pp. 1062–1067.

"Omnidirectional Video Camera", by Shree K. Nayar, DARPA Image Understanding Workshop, May 1997, pp. 1–7.

"Catadioptric Image Formation", by Shree K. Nayar et al., DARPA Image Understanding Workshop, May 1997, pp. 1–7.

*Primary Examiner*—Wendy R. Garber
*Assistant Examiner*—Aung S. Moe
(74) *Attorney, Agent, or Firm*—Gilberto M. Villacorta; Pepper Hamilton, LLP

(57) ABSTRACT

Optical systems are disclosed that enable an image sensor to generate an image of either a wide-angle view of an area of interest, or a direct view of an area of interest. In an embodiment, a wide-angle optical system is mounted to reflect radiation reflected from the area of interest along an optical axis. Radiation on the optical axis is directed to a zoom lens of the image sensor. Optionally, a planar mirror redirects the radiation, so that the optical axis is angled with respect to a central axis of the image sensor. In the preferred embodiment, the image sensor is a pan-tilt-zoom camera that can move from the wide-angle view to a direct view of a target or region of interest, using pan, tilt, and zoom controls, under either remote or automatic control. The disclosure also provides a method for maintaining registration of the image sensor when it is moved from a wide-angle view of a target to a direct view of a target.

52 Claims, 9 Drawing Sheets

U.S. PATENT DOCUMENTS

| | | | | |
|---|---|---|---|---|
| 5,257,089 | * | 10/1993 | Stetson | 356/353 |
| 5,359,363 | | 10/1994 | Kuban et al. | 348/36 |
| 5,394,209 | | 2/1995 | Stiepel et al. . | |
| 5,444,235 | * | 8/1995 | Redford | 250/208.1 |
| 5,495,376 | | 2/1996 | Ritchey | 395/125 |
| 5,539,483 | | 7/1996 | Nalwa | 353/94 |
| 5,557,454 | * | 9/1996 | Takhashi | 348/45 |
| 5,589,901 | | 12/1996 | Means . | |
| 5,627,616 | | 5/1997 | Sergeant et al. . | |
| 5,760,826 | * | 6/1998 | Nayar | 348/36 |
| 5,774,569 | * | 6/1998 | Waldenmaier | 348/143 |
| 5,790,181 | * | 8/1998 | Chahl et al. | 348/36 |
| 5,864,713 | * | 12/1998 | Kuroda et al. | 359/850 |
| 5,909,244 | * | 6/1999 | Waxman et al. | 348/222 |
| 5,990,934 | * | 11/1999 | Nalwa | 348/36 |
| 6,118,474 | | 9/2000 | Nayar | 348/36 |

\* cited by examiner

ADJUSTABLE IMAGING SYSTEM WITH WIDE ANGLE CAPABILITY

FIELD OF THE INVENTION

This invention generally relates to optics and cameras. The invention relates more specifically to optical systems for obtaining both wide and narrow fields of view of an area of interest.

BACKGROUND OF THE INVENTION

In the security and surveillance field, it is common practice to monitor rooms or other areas of interest with pan-tilt-zoom ("PTZ") cameras. Generally a PTZ camera is mounted in a transparent dome above or on the ceiling of the area of interest. The camera usually is a closed-circuit television camera. The camera is controlled remotely or automatically in order to view regions of interest within the room.

While such cameras can view any region, area of interest, or target, they have a relatively narrow field of view, and cannot see all regions at once. To view a different region of interest, the camera is commanded to pan, tilt, and/or zoom as necessary to bring the new region of interest into view. The process of panning, tilting, and/or zooming to the new region of interest or target takes time, and when the camera is viewing the new region or target, it can no longer see the original region. This limits the effectiveness of such cameras, since activities can only be monitored, recorded or tracked in one area at a time. Unmonitored areas are subject to unmonitored intrusions.

Omnidirectional imaging systems have been developed which permit simultaneous viewing and image capture of an entire room. These systems employ an image sensor that is mounted to receive light rays reflected from a wide-angle reflector, such as a parabolic mirror, in order to capture an omnidirectional, often hemispherical image. Embodiments of omnidirectional imaging systems are described in U.S. patent application Ser. No. 08/644,903, entitled "Omnidirectional Imaging Apparatus," filed May 10, 1996.

One significant drawback of such omnidirectional imaging systems is that they provide only a wide-angle view of the area of interest. Because of the large viewing angle used to provide the wide-angle view, the resulting image has limited resolution. For example, when a video camera is used to capture a video image of a large room using a wide-angle view, a relatively small number of pixels of the video display are used to display each region of the room. Consequently, it is hard to make out details of the area of interest or to locate small objects. Further, the camera is fixed with respect to the wide angle optical system. As a result, a video image generated from the image sensor's signal shows the room or area of interest only from the viewpoint of the wide-angle reflector, and the views of the room have relatively low resolution.

Omnidirectional cameras also have been developed using fisheye lenses to capture wide, panoramic images.

However, the resolution of the images produced by all the above-described systems is limited by the fact that the field of view is projected onto a sensor which is typically used to generate an image for a much narrower field of view. For example, a conventional sensor might produce an image on a computer display screen having 640×480 pixels. Similar levels of resolution are supported by broadcast standards such as NTSC and S-video. Sensors with higher resolution are unusual and are very expensive; one reason is that it is difficult to capture and transmit the large amount of image data involved in real time. Hence, the number of pixels of the sensor that is available for any particular region in the image is relatively small, especially for omnidirectional systems with very wide fields of view.

Another approach to wide field of view imaging, typically used for still frame photography, is the rotating panoramic camera, as exemplified by the Kodak Roundshot™. Cameras of this type take still frame exposures of several different but contiguous regions in sequence, and then concatenate them to form a panoramic image. Each exposure typically appears as a thin strip of the final image. Since these cameras take multiple exposures, obtaining a complete panoramic image takes on the order of several seconds. Accordingly, they are useful typically in the still frame area only, rather than video or real-time surveillance applications, in which high frame rates are necessary.

Based on the foregoing, there is a clear need for an optical system that can provide both a wide-angle view of an area of interest, and a close-up view of a particular region within the area of interest, using a single image sensor.

There is also a need for an optical system that can provide both a wide-angle view of an area of interest and a narrower view of a particular region within the area of interest, using a single image sensor, while maintaining registration between the wide field of view and close-up view when the image sensor is moved from the wide-angle view to a narrower view. There is also a need for an optical system that fulfills the foregoing needs and can be remotely controlled to carry out movement from the wide-angle view to the narrower view.

There is also a need for an optical system that fulfills the foregoing needs and can be automatically controlled to carry out movement from the wide-angle view to the narrower view.

SUMMARY OF THE INVENTION

These needs, and other needs described herein, are fulfilled by the preferred embodiment of the present invention, which generally comprises, in one aspect, an optical system that provides a wide field of view and a direct field of view of an area of interest, comprising a wide-angle optical system that reflects electromagnetic radiation from the wide field of view in the area of interest; an image sensor that can sense the radiation and generate a signal representing a visible image from the radiation; and means for moving the image sensor to a first position in which the image sensor receives the radiation reflected from the wide-angle optical system and forms a wide field of view image of the area of interest, and for moving the image sensor to a second position away from the wide-angle optical system in which the image sensor receives radiation from the area of interest and forms a direct field of view image.

One feature of this aspect is that the image sensor receives radiation from the area of interest without the radiation being first reflected from the wide-angle optical system and forms a direct field of view image. Another feature is means for redirecting radiation reflected from the wide-angle optical system to the image sensor. Still another feature is that the wide-angle optical system provides a substantially hemispherical field of view of the area of interest.

According to feature, the wide-angle optical system comprises a curved mirror. A related feature is that the curved mirror is formed with a partial quadric surface. Another related feature is that the curved mirror is a spherical mirror. Another related feature is that the curved mirror is a parabolic mirror. Still another related feature is that the curved mirror is a hyperbolic mirror. Yet another related feature is that the curved mirror is an elliptical mirror. Another related feature is that the wide-angle optical system comprises a plurality of planar mirrors.

Another feature is that the wide-angle optical system comprises a faceted surface, and in which each facet of the faceted surface is a mirror. Still another feature is that the wide-angle optical system comprises a faceted surface, and in which each facet of the faceted surface is a curved mirror.

According to another feature, the wide-angle optical system comprises a curved mirror and a second mirror aligned to receive radiation reflected from the curved mirror and to direct the reflected radiation to the image sensor. A related feature is that the curved mirror is a paraboloid mirror having a curved outer surface that substantially obeys the equation $z=(h^2-r^2)/2h$, where z is an axis of rotation, r is a radial coordinate, and h is twice the focal length of the paraboloid mirror.

Another related feature is that the wide-angle optical system comprises a curved mirror, and in which the means for redirecting radiation comprises a planar mirror aligned to receive radiation reflected from the curved mirror and to direct the reflected radiation to the image sensor. Still another feature is that the means for redirecting radiation comprises one or more reflecting surfaces. A related feature is that the means for redirecting radiation comprises one or more refracting surfaces. Another related feature is that the means for redirecting radiation comprises one or more optical fibers.

In another feature, the image sensor and the means for moving the image sensor comprises a pan-tilt-zoom (PTZ) camera. According to another feature, the means for redirecting radiation received from the wide-angle optical system to the image sensor comprises a relay lens axially aligned with a zoom lens. A related feature is that the image sensor and the means for moving the image sensor comprises a pan-tilt-zoom (PTZ) camera.

In still another feature of this aspect, the image sensor is aligned, when in the first position, to receive the radiation along an imaging axis that is substantially coincident with an optical axis of the wide-angle optical system.

According to another feature, the optical system further comprises one or more processors; and a memory coupled to the one or more processors, the memory having stored therein sequences of instructions which, when executed by the one or more processors, cause the one or more processors to move the image sensor from the first position to the second position by causing the processor to perform the steps of determining first coordinates of a first viewpoint associated with the wide field of view image, second coordinates of a second viewpoint associated with the direct field of view image, and direction of a target in a first coordinate system associated with the first viewpoint; converting the direction into a ray extending from the first viewpoint to the target; computing an intersection of the ray with values describing a reference plane on which the target lies to obtain third coordinates; translating the third coordinates into a second coordinate system that is associated with the second viewpoint to obtain fourth coordinates; and converting the fourth coordinates into a pan angle value, a tilt angle value, and a focal distance value representing the second position.

A related feature is that the sequences of instructions further cause the one or more processors to carry out the step of commanding the image sensor to move from the first position to the second position according to the pan angle value, tilt angle value, and focal distance value.

According to another feature, the optical system further comprises one or more processors; and a memory coupled to the one or more processors, the memory having stored therein sequences of instructions which, when executed by the one or more processors, cause the one or more processors to move the image sensor from the first position to the second position by causing the processor to perform the steps of receiving a target height value $z_2$ and a vector S directed from a viewpoint associated with the direct field of view image to a second viewpoint associated with the wide field of view image, wherein the first viewpoint and the second viewpoint is respectively associated with a first coordinate system and a second coordinate system; computing a pan angle $\theta_2$ and a tilt angle $\phi_2$; computing a vector $T_2$ of target coordinates $(x_2, y_2, z_2)$ in the second coordinate system associated with the second viewpoint by computing the equations $r_2=z_2/\cos\phi_2$; $x_2=z_2/[\sin\phi_2\cos\phi_2\cos\theta_2]$; and $y_2=z_2/[\sin\phi_2\cos\phi_2\sin\theta_2]$; converting the vector $T_2$ of target coordinates to a vector $T_1$, of target coordinates in the first coordinate system by computing the equations $T_1=S+T_2$; $T_1=(x_1, y_1, z_1)$; computing a focus value, a pan value, and a tilt value for the image sensor, by computing the equations $r1=\sqrt{x_1^2+y_1^2+z_1^2}$; $\theta_1=\tan^{-1}(Y_1/x_1)$; $\phi_1=\cos^{-1}(z_1/r_1)$; and moving the image sensor from the first position to the second position using the focus value, pan value, and tilt value.

In another feature, the optical system further comprises one or more processors; and a memory coupled to the one or more processors, the memory having stored therein a plurality of presets, each of the presets comprising information describing a pre-defined position of the image sensor that provides a direct view of the area of interest; and sequences of instructions which, when executed by the one or more processors, cause the one or more processors to move the image sensor from the first position to the second position by causing the processor to perform the steps of determining first coordinates of a first viewpoint associated with the wide field of view image, second coordinates of a second viewpoint associated with the direct field of view image, and direction of a target in a first coordinate system associated with the first viewpoint; converting the direction into a ray extending from the first viewpoint to the target; computing an intersection of the ray with values describing a reference plane on which the target lies to obtain third coordinates; translating the third coordinates into fourth coordinates in a second coordinate system that is associated with the second viewpoint; and selecting one of the plurality of presets that provides a direct view of a region of the area of interest that includes the fourth coordinates.

According to another feature, the sequences of instructions further comprise instructions that cause the processor to carry out the step of commanding the image sensor to move to the selected preset. In another feature, the plurality of presets collectively defines direct views of the entire area of interest. Yet another feature is that each of the presets comprises values representing a pan position, tilt position, and zoom position of the image sensor.

According to another feature, the optical system further comprises a computer-readable medium carrying sequences of instructions which, when executed by one or more processors, cause the one or more processors to move the image sensor from the first position to the second position by causing the processor to perform the steps of determining first coordinates of a first viewpoint associated with the wide field of view image, second coordinates of a second viewpoint associated with the direct field of view image, and direction of a target in a first coordinate system associated with the first viewpoint; converting the third coordinates into a ray extending from the first viewpoint to the target; computing an intersection of the ray with values describing a reference plane on which the target lies to obtain third coordinates; translating the third coordinates into a second coordinate system that is associated with the second viewpoint to obtain fourth coordinates; and converting the fourth coordinates into a pan angle value, a tilt angle value, and a focal distance value representing angular and focal differences of the first position from the second position.

A related feature is that the sequences of instructions further cause the one or more processors to carry out the step of commanding the image sensor to move from the first position to the second position according to the pan angle value, tilt angle value, and focal distance value.

According to another feature, the optical system further comprises a computer-readable medium having stored therein a plurality of presets, each of the presets comprising information describing a pre-defined position of the image sensor that provides a direct view of the area of interest; and sequences of instructions which, when executed by one or more processors, cause the one or more processors to move the image sensor from the first position to the second position by causing the processor to perform the steps of determining first coordinates of a first viewpoint associated with the wide field of view image, second coordinates of a second viewpoint associated with the direct field of view image, and direction of a target in a first coordinate system associated with the first viewpoint to obtain third coordinates; converting the third coordinates into a ray extending from the first viewpoint to the target; computing an intersection of the ray with values describing a reference plane on which the target lies; translating the third coordinates into fourth coordinates in a second coordinate system that is associated with the second viewpoint; and selecting one of the plurality of presets that provides a direct view of a region of the area of interest that includes the fourth coordinates.

One feature related to the foregoing feature is that the sequences of instructions further comprise instructions that cause the processor to carry out the step of commanding the image sensor to move to the selected preset. Another feature is that the plurality of presets collectively defines direct views of the entire area of interest. A further feature is that each of the presets comprises values representing a pan position, tilt position, and zoom position of the image sensor. Thus, in general, in one embodiment, an optical system provides both a wide-angle view of an entire room or other area of interest and, in addition, high-resolution zoom capability into any region within the room under either remote or automatic control. The optical system has wide-angle optics that operate in conjunction with a movable image sensor. In one embodiment, the image sensor is mounted to point toward the wide-angle optical system, and to receive light rays reflected from it. In this orientation, the image sensor produces, with an appropriate zoom setting, a wide-angle image. The image sensor produces a conventional narrow field image with greater resolution when the image sensor is oriented at a region of interest and away from the wide-angle optical system. Registration is achieved and maintained between the wide field of view and narrow field of view images.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
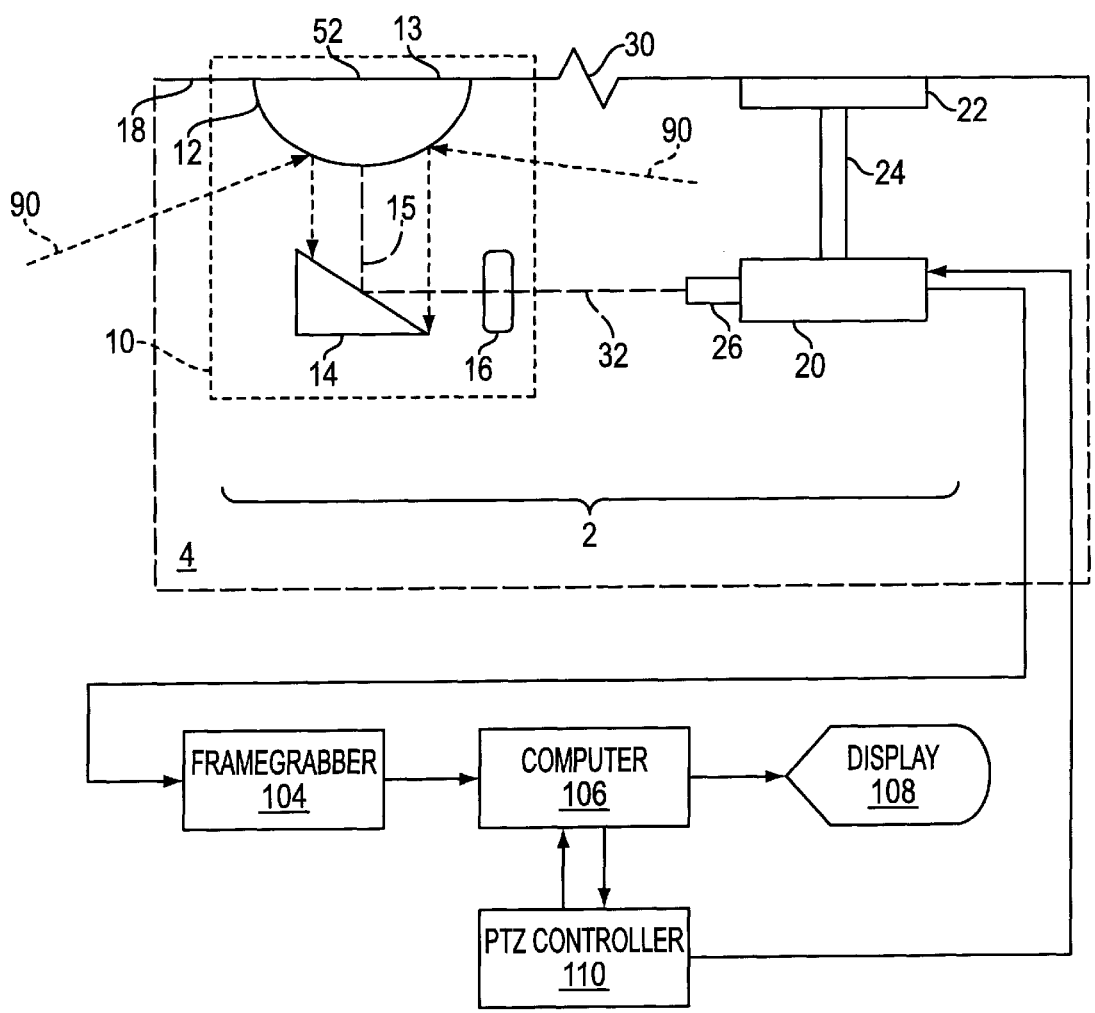
FIG. 1 is a simplified side elevation view of a first embodiment of an optical system.

An optical system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. For example, some of the drawing figures are simplified so as to omit unimportant mechanical or structural details such as fasteners, fixtures, etc.

FIG. 1 is a side elevation view of a first embodiment of an optical system 2 within a room or area of interest 4 for which surveillance or viewing is desired. An image sensor 20 is mounted on the ceiling 18 of the area of interest 4, using an appropriate mounting bracket having a ceiling fixture 22 and a downwardly vertically extending arm 24. In the preferred embodiment, the image sensor 20 is a video camera that can pan or tilt toward the area of interest 4, so as to view any region of interest within the area of interest, and optically zoom-in to capture a detailed view of a narrower region. Thus, the image sensor 20 has a zoom lens 26 that can move under electronic control. The image sensor 20 also has motors and controls that enable the image sensor to move laterally (pan) and move up and down (tilt), under electronic control The pan and tilt motors may be used to point the image sensor 20 in an arbitrary direction.

The specific configuration, size, and type of the fixture 22 and arm 24 are not critical, as long as the image sensor 20 is separated from the ceiling 18 by a vertical distance sufficient to allow the image sensor to be aligned with the optical elements of the system 2, which will be described below.

Pan-tilt-zoom cameras that can be used as the image sensor 20 are commercially available from Philips N.V., Sensormatic, Pelco, Kalatel, and other manufacturers. An example of a mounting structure that can be used for the image sensor 20 is described in U.S. Pat. No. 5,627,616 (Sergeant et al.), incorporated herein by reference.

The image sensor 20 is a device that can receive electromagnetic radiation reflected as described below and that can form an image or other tangible representation of the radiation. In the preferred embodiment, the image sensor 20 is a video camera having a zoom lens 26. In alternate embodiments, the image sensor 20 is a still camera that uses conventional photographic film, motion picture photographic camera, digital still frame camera, camcorder, or digital video camera.

A wide-angle optical system 10 is mounted to the ceiling 18 of the area of interest 4. The wide-angle optical system 10 is mounted in alignment with the image sensor 20 along axis 32, and in reasonable proximity to the image sensor. As indicated by the broken segment 30 of the line in FIG. 1 representing the ceiling 18, the particular distance separating the image sensor 20 from the wide-angle optical system 10 is not critical. The distance is dependent on several factors, such as the amount of ambient light in the area of interest 4, the aperture, type and focal length of the lens of the image sensor 20, and other factors.

The wide-angle optical system 10 comprises a mirror 12 mounted to the ceiling 18. In the preferred embodiment, the mirror 12 is a convex mirror formed such that the curved outer surface of the mirror 12 is directed downward into the area of interest 4. In the preferred embodiment, the mirror 12 is formed as a paraboloid. The mirror 12 is formed of a polymer or plastic coated with a reflective material, glass, polished steel, or any other suitable reflecting material.

The mirror 12 is defined in cylindrical coordinates, r, θ and z, as generally conforming to the equation $$z=(h^2-r^2)/2h$$

where z is the axis of rotation, r is the radial coordinate, and h is a constant substantially representing twice the focal length of the mirror 12. The z axis is coincident with the optical axis of the wide-angle imaging system. A focus point 52 of the paraboloid defined by the above equation is coincident with the origin of the coordinate system. The mirror 12 is truncated along a plane 13 that is parallel to the ceiling 18 and which includes the focus point 52. In other embodiments, the paraboloid is extended past the plane containing its focus.

A planar mirror 14 is mounted at a 45-degree angle with respect to the horizontal plane of the ceiling 18. When the image sensor 20 is pointing at the planar mirror, light rays reflected vertically downward from the parabolic mirror 12 are directed horizontally along axis 32 to the lens of the image sensor 20. A relay lens 16 is mounted in a location horizontally disposed between the zoom lens 26 of the image sensor 20 and the planar mirror 14. The relay lens can be formed in any manner that is suitable to cause principal rays of electromagnetic radiation reflected from the mirror 12 to become aligned substantially parallel to the central axis 32 of the zoom lens. In an alternative embodiment, the relay lens may be located between the parabolic mirror and the planar mirror.

In this arrangement, all incoming light rays 90 that are reflected from the area of interest 4 are reflected by the mirror 12 in a substantially vertical direction to the planar mirror 14. The planar mirror 14 redirects the optical path of the light rays 90 along a generally horizontal axis 32, through the relay lens 16 and the zoom lens 26 and into the image sensor 20. All incoming light rays 90 that would otherwise pass through the focus point 52 are orthographically reflected towards the planar mirror 14 by the paraboloid mirror 12. Thus, the focus point 52 is coincident with the single viewpoint from which the image formed at the image sensor 20 is viewed. The planar mirror 14 positioned at a 45-degree angle with respect to the optical axis 15 of the paraboloid mirror 12, such that the center of the planar mirror is generally aligned with the optical axis 15. Accordingly, an image of a substantially hemispherical scene is formed orthographically at the image sensor 20. In alternative embodiments, extending or shortening the mirror provide more or less than a hemispherical view, respectively.

In this arrangement, physically separating the wide angle optical system from the image sensor 20 eliminates the problems of mechanical and optical interference caused by motors and drives. Commercially available PTZ cameras can be used in this configuration without modification. In addition, this arrangement enables the viewing of a substantially hemispherical scene of the area of interest 4 from a single viewpoint. That orthographic reflection enables viewing from a single viewpoint can be demonstrated mathematically and geometrically using the procedure disclosed in pages 14–17 of the above-referenced co-pending U.S. patent application Ser. No. 08/644,903. The disclosure of pages 14–17 of that application, and only such pages, is hereby incorporated by reference as if fully set forth herein.

Although the description provided herein is given in the context of visible light, the embodiments described herein have equal application to other forms of electromagnetic radiation, such as infrared light, ultraviolet light, x-rays, etc.

In the preferred embodiment, the image sensor 20 generates an electronic signal such as an NTSC video signal that is representative of the reflected image, which is coupled by a signal transmission means 102, such as a cable, to a framegrabber 104. The framegrabber 104 is a conventional video signal frame grabber, such as a Matrox Meteor card. The framegrabber 104 converts the video signal into a framebuffer which is updated at 30 Hz and provides it to a general-purpose computer 106 having an output display 108. The computer 106 is programmed to enable a user to view any desired portion of the image received by the image sensor 20, and to control the image sensor to zoom in on a selected portion of the scene, or to tilt or pan the scene in any desired manner. In addition, using the computer 106 under program control, a user can command the image sensor 20 to directly view any region of interest within the area of interest 4, without receiving an image reflected from the mirror 12.

In embodiments in which the image sensor 20 is a conventional PTZ camera, as is known in this art, the camera generally has three stepper motors and a movable platform or mount. One of the stepper motors is coupled to the zoom lens 26 of the camera, so that rotation of the motor causes the zoom lens to move to a different focal length. For example, a gear on a shaft of the motor cooperates with a toothed ring affixed to the outside surface of the zoom lens, so that when the motor shaft turns, the gear urges the ring to rotate the zoom lens. Second and third motors control movable surfaces that pan and tilt the camera. Additional motors may be used for auxiliary functions such as iris control.

As shown in FIG. 1, a PTZ Controller 110 is coupled to the computer 106, for example, through an RS-232 serial data link. Alternatively, an RS-485 serial data link is used. The PTZ Controller 110 receives commands from the computer over the RS-232 link, transforms the commands into one or more controlled voltage signals, and communicates the signals to the motors. Position or velocity sensors such as potentiometers are coupled to the motors to enable the PTZ Controller 110 to receive feedback about the movement and position of the motors. An example of a computer-controlled pan-tilt unit suitable for use with an image sensor in the embodiments described herein is Model PTU-46-17.5, available from Directed Perception, Inc. An exemplary PTZ camera is described in U.S. Pat. No. 5,627,616 (Sergeant et al.).

In the preferred embodiment, the optical system 2 also includes a mechanism, in the program that controls the computer 106, for persistently storing values that identify the pan, tilt, and zoom position of the image sensor 20 when the camera is directed at the wide angle optical system 10 rather than at the area of interest 4. Remembering these values enables the operator of the image sensor 20 to rapidly move the camera from a view of the area of interest 4 to view images reflected front the wide-angle optical system 10. Alternatively, the values may be stored in the PTZ controller 110.

The planar mirror 14 serves as a light redirection means. Any other light redirection means may be substituted, including one or more reflecting surfaces, one or more refracting surfaces and/or one or more optical fibers or optical fiber bundles. Alternatively, the planar mirror 14 may be made non-planar, for purposes of enhancing the image.

The convex parabolic mirror 12 is merely an example of a means for achieving the wide-angle optical system 10. In alternative embodiments, the wide-angle optical system 10 uses a concave parabolic mirror, a hyperbolic mirror, elliptical mirror, or spherical mirror, and modified lenses that achieve an orthographic projection of the target or region of interest.

Another alternative for achieving the wide-angle optical system is to use several planar mirrors. For example, four planar triangular mirrors are arranged to form a convex pyramidal reflecting surface to achieve a wide field of view. An assembly of the four planar triangular mirrors is mounted in the embodiment of FIG. 1 in place of the mirror 12, such that the apex of the pyramidal reflecting surface is directed vertically downward and the base of the pyramidal reflecting surface is mounted to the ceiling 18. An assembly of this type used for omnidirectional imaging is described in U.S. Pat. No. 5,539,483 (Nalwa), incorporated herein by reference. Nalwa uses this optical configuration with four separate image sensors to obtain a single viewpoint. To adapt Nalwa to the present context, four rigidly coupled cameras are used, or a single camera is used.

An omnidirectional imaging system can be constructed using a camera, a parabolic mirror and a telecentric lens. As described in S. Nayar, "Omnidirectional Video Camera," Proc. of DARPA Image Understanding Workshop, May 1997, incorporated herein by reference, the telecentric lens may be effectively approximated using a conventional zoom lens and a relay lens. A telecentric lens is sometimes not required when the wide-angle optical system uses a mirror formed in a shape other than paraboloid. For example, a wide-angle optical system can comprise a hyperbolic mirror and a conventional perspective lens. In some applications, the zoom lens of a PTZ camera serves as the perspective lens; alternatively, a relay lens is used. Thus, in these embodiments, the use of a telecentric lens, relay lens, or other means for rendering reflected radiation telecentric, is not necessarily required.

Figure 2A:
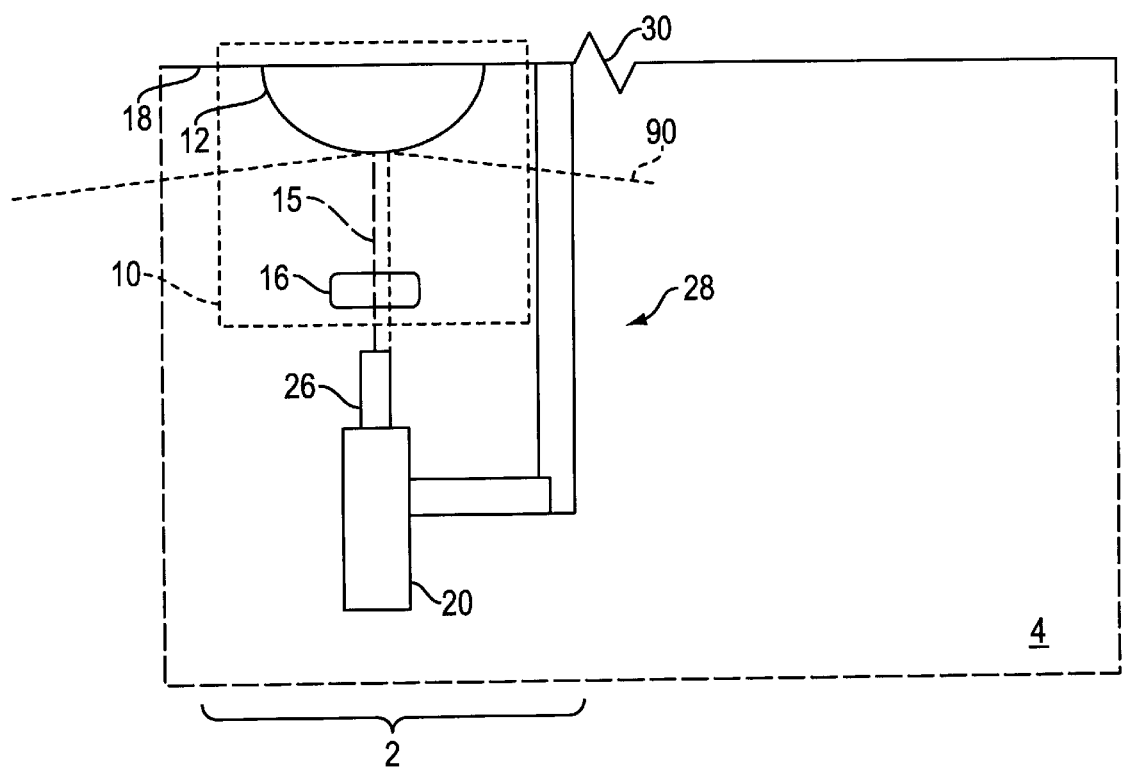
FIG. 2A is a simplified side elevation view of a second embodiment of an optical system.

FIG. 2A is a diagram of an alternate embodiment of an optical system 2 that comprises a wide-angle optical system 10 and an image sensor 20. A mirror 12 is preferably mounted on the inside top surface or ceiling 18 of the area of interest 4. The image sensor 20 is mounted using a bracket or mount 28 so that the image sensor is positioned vertically below and orthogonal to the ceiling 18 and the relay lens 16. The zoom lens 26 of the image sensor 20 is mounted to face substantially vertically upwardly and is aligned with an optical axis 15 of the wide-angle optical system 10. The mirror 12 preferably is a convex parabolic or paraboloid mirror.

In this arrangement, incoming light rays 90 from the area of interest 4 are reflected from the mirror 12 vertically downward through the relay lens 16. The light rays 90 are directed through the relay lens 16 toward the zoom lens 26. In combination, the relay lens 16 and the zoom lens 26 cause the rays 90 reflected along the axis 15 of the mirror 12 to be telecentric.

In this embodiment, no planar mirror of the type shown in FIG. 1 is required. Accordingly, the embodiment of FIG. 2A avoids certain optical losses and additional maintenance that might be entailed with the embodiment of FIG. 1. An advantage of the embodiment of FIG. 2A is that the wide-angle optical system and the image sensor can be incorporated into one unit such that the wide-angle optical system and the image sensor have a rigid, fixed geometric relationship. Consequently, it is unnecessary to calibrate the relative positions of the wide-angle optical system and the image sensor when the unit is installed. Preferably, the mount 28 is constructed of a transparent material or using thin materials so as to minimize the obstruction of rays 90 by the mount 28.

Figure 2B:
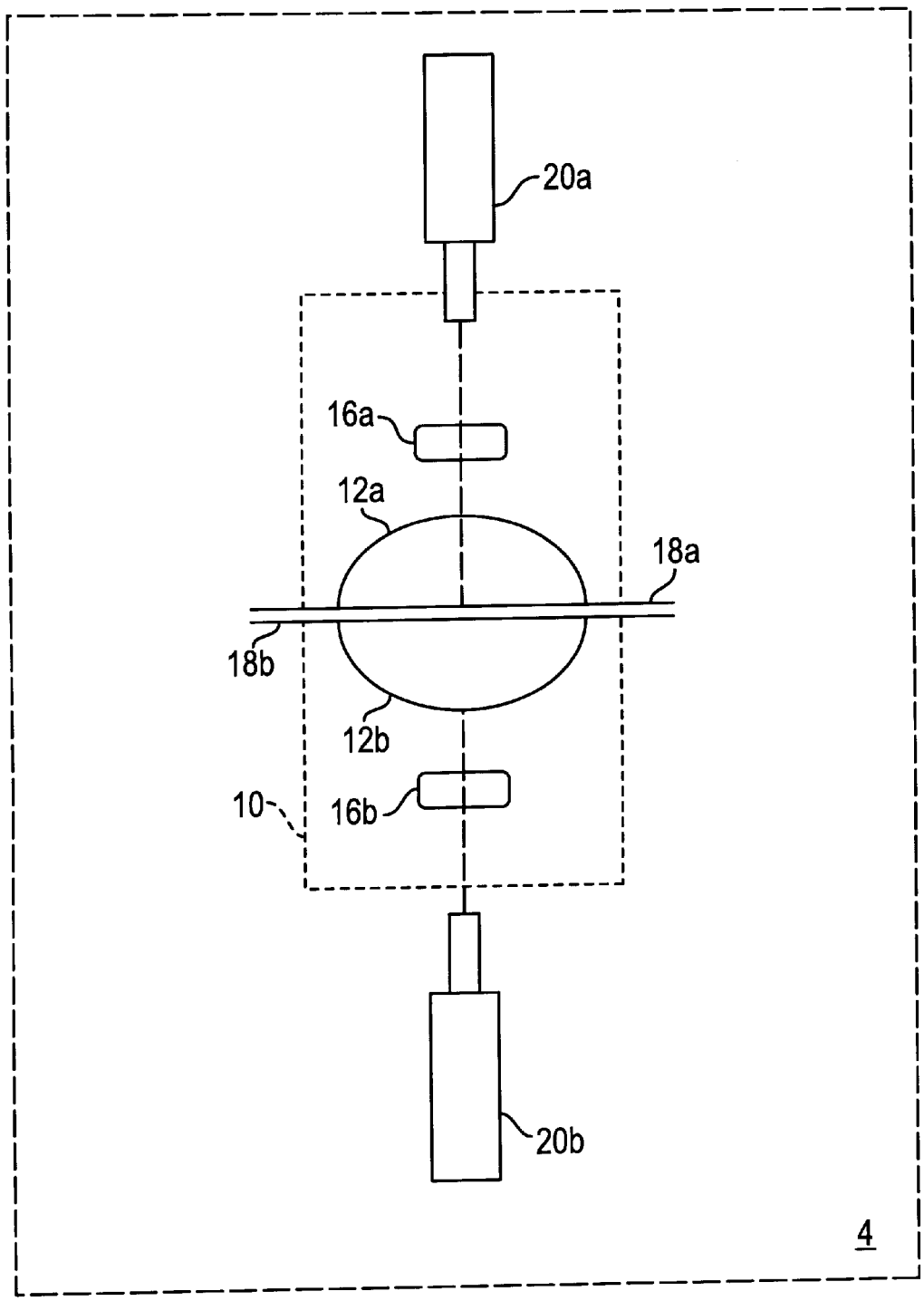
FIG. 2B is a simplified side elevation view of a third embodiment of an optical system.

FIG. 2B is a diagram of another embodiment in which first and second cameras 20a, 20b are mounted in vertically opposite positions to view first and second parabolic mirrors 12a, 12b respectively. The horizontal or bottom surfaces 18a, 18b of the parabolic mirrors 12a, 12b are mounted in close proximity. Alternatively, they are secured together. Each image sensor 20a, 20b views light reflected from one of the parabolic mirrors 12a, 12b through first and second lenses 16a, 16b. The lenses 16a, 16b and the mirrors 12a, 12b form a wide-angle optical system.

The back-to-back configuration of the mirrors 12a, 12b enables the cameras 20a, 20b to collectively view the entire area of interest 4 with a spherical field of view.

In a preferred embodiment, each of the mirrors 12a, 12b is mounted in a protective transparent hemispherical dome that is made, for example, of high-impact clear plastic. The lens 16a is mounted in a tube, one end of which is secured to the dome that is opposite mirror 12a. The zoom lens of the image sensor 20a is secured to the other end of the tube. In this configuration, the mirrors, lenses, and cameras are rigidly mounted together, facilitating use of the unit in a secured area.

Figure 3A:
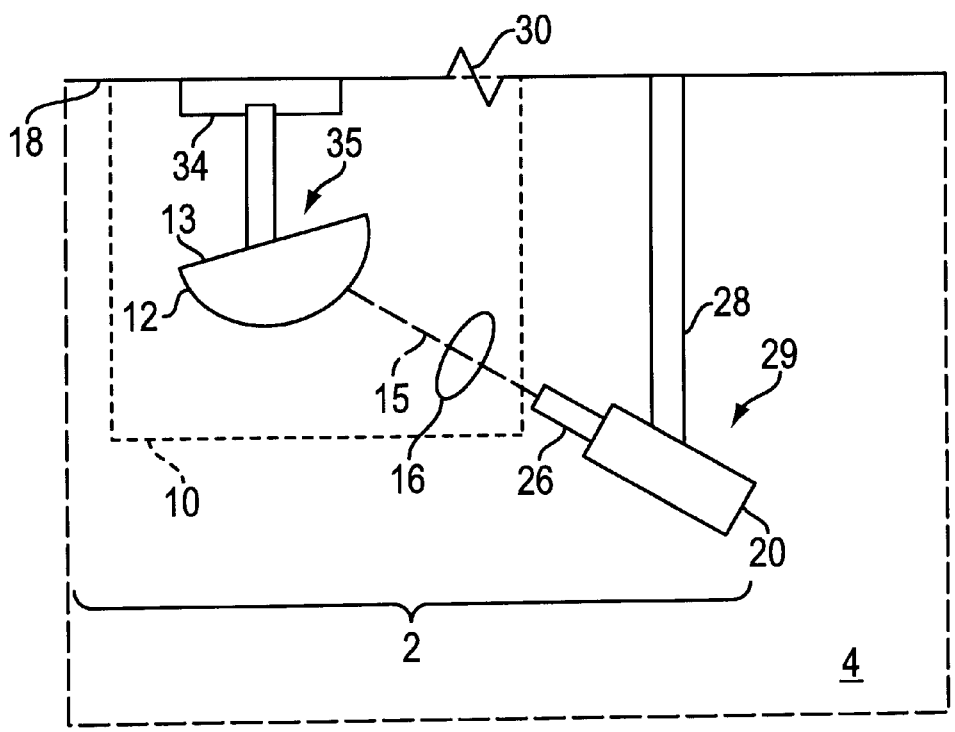
FIG. 3A is a simplified side elevation view of a fourth embodiment of an optical system.

FIG. 3A shows another embodiment of an optical system 2, comprising a wide-angle optical system 10 and an image sensor 20. The image sensor 20 is affixed to the top surface 18 or ceiling of the area of interest 4 by a mount 28. The lower end 29 of the mount 28 is affixed to the image sensor 20 at an angle such that the image sensor is directed angularly upward at the wide-angle optical system 10. A mirror 12, preferably a truncated convex parabolic mirror, is mounted to the top surface 18 using an appropriate mount 34. The flat upper non-reflecting base 13 of the mirror 12 is secured to the mount 34 at an acute angle with respect to the horizontal plane of the floor or ceiling of the area of interest 4. For example, the mirror 12 is secured to the mount 34 using a plate or fixture that can be tilted and rotated with respect to the end of the mount 34, enabling the mirror to be aligned with axis 15. Similarly, the optical sensor 20 is attached to its mount 28 using a fixture that can be tilted and rotated with respect to the mount 28, facilitating alignment of the image sensor with an optical axis of the mirror.

The optical axis 15 of the convex parabolic mirror 12 is aligned with the center axis of a zoom lens 26 of the image sensor 20. A relay lens 16 is mounted normal to the optical axis at a position between the zoom lens 26 and the mirror 12 using a suitable mount. In the preferred embodiment, the relay lens 16 is mounted in a fixed relationship to the mirror 12.

In this arrangement, incoming light rays 90 are uniformly reflected in alignment with the optical axis 15 of the mirror 12. The angular mounting of the mirror causes the optical axis 15 to be aligned at an angle with respect to the horizontal. The reflected light rays 90 are directed through the relay lens 16 to the zoom lens 26. In combination, the relay lens 16 and the zoom lens 26 operate to cause the reflected light rays 90 to be telecentric when the light rays 90 arrive at the image sensor 20.

Figure 3B:
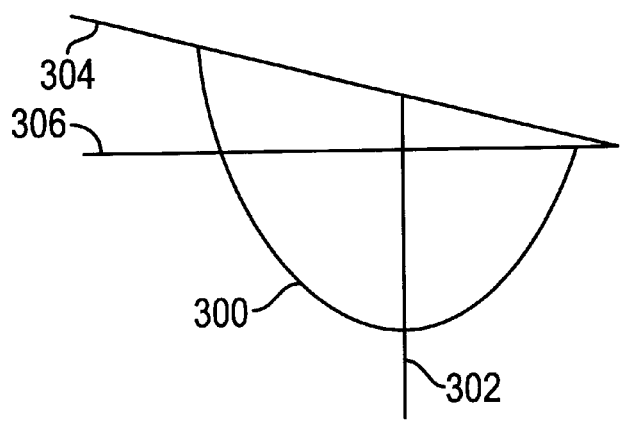
FIG. 3B is a simplified profile diagram of the geometry of a parabolic mirror that is truncated off-axis.

It is desirable for the zoom lens 26 to be aligned with the axis 15 of the mirror 12. However, the parabolic mirror 12 may be truncated or cut off-axis. That is, the base 13 of the mirror 12 need not be orthogonal to the axis 15 of the mirror. FIG. 3B is a diagram of the geometry of a parabolic object 300 that is cut off-axis. In a conventional arrangement, the optical axis 302 of the parabolic object 300 is normal to the base 306. Alternatively, parabolic object 300 is formed with an off-axis base 304 arranged at an angle with respect to the optical axis 302. In this arrangement, the parabolic mirror 300 is mounted on a substantially vertical mount, and the optical axis 302 is directed at an angle to an image sensor. When the mirror 12 is cut off-axis, substantially hemispherical views are achieved at the image sensor 20 even though the image sensor is mounted at an angle with respect to the base 13 of the mirror.

In an alternate embodiment, to provide flexibility in the relative positioning of the image sensor 20 and the mirror 12, the mirror is mounted on a movable fixture. The movable fixture enables the mirror to be laterally panned and vertically tilted, so that the axis of the mirror 12 is easily aligned with that of the image sensor 20.

Advantageously, the embodiment of FIG. 3A eliminates the need for the light redirection means shown in FIG. 1. It also avoids potential mechanical and optical interference in the path of the light rays 90 that could be caused by the mount 28 shown in the embodiment of FIG. 2A.

Each of the foregoing embodiments is preferably used in the context of an conventional image processing system having the basic components shown in FIG. 1, and comprising a computer system of the type shown in FIG. 6, which will be described in more detail below. Generally, the image sensor 20 provides an analog video signal to an interface in the computer system. The interface digitizes the analog video signal and directs digital data representing the video signal to a frame buffer or other memory system. The memory system is a two-port memory that can simultaneously and in real time receive digital image data and output the digital data to a display, such as a computer monitor. The interface and the memory system operate under control of conventional driver software. In this configuration, the image processing system continually acquires image information from the image sensor 20 and displays it on the computer display.

The image processing system also includes an application program that allows a human end user to manipulate the image displayed on the computer display, and carry out other image processing functions. Depending on the needs of the end user, the application program may also carry out camera control functions such as remote control of pan, tilt, and zoom functions of the camera. Using these functions, the image sensor can be moved to directly view the room or area of interest without the aid of the wide-angle reflector.

However, when the image sensor is moved to directly view the area of interest, the image sensor's signal shows the area of interest from the separate viewpoint of the image sensor. Accordingly, it is difficult for an operator of the image sensor to smoothly and accurately move the image sensor to directly view an object of interest that is shown in wide-angle image. Instead, the operator must move the image sensor from a wide-angle view to a direct view, adjust to the location of objects in the area of interest, and then apply appropriate pan, tilt, or zoom commands to guide the image sensor to the correct position.

For example, an operator identifies a target in the area of interest 4 while viewing the area of interest using an image reflected from the wide-angle optical system 10 to the image sensor 20. It can be difficult to select the appropriate pan angle, tilt angle, and zoom distance for the camera that will cause a direct image from the camera to show the target, because of the difference in image appearance and perspective in the direct view compared to the wide angle view. It is also time-consuming and error-prone to search the area of interest 4 using the direct image, because it has a narrow field of view.

Accordingly, each of the foregoing embodiments preferably includes a mechanism for registering the wide field of view images that are produced by the wide-angle optical system 10 with those produced by the image sensor 20. The registration mechanism is important, for example, in order to permit a user to control the pan, tilt and zoom of an image sensor 20 by selecting a point or region of interest within the area of interest 4 as depicted in the wide field of view image. A registration mechanism is also needed to enable the pan, tilt and zoom of an image sensor 20 to be controlled smoothly when the camera is being used to track a moving object that is shown in an omnidirectional image reflected from the wide angle optical system 10.

Figure 4A:
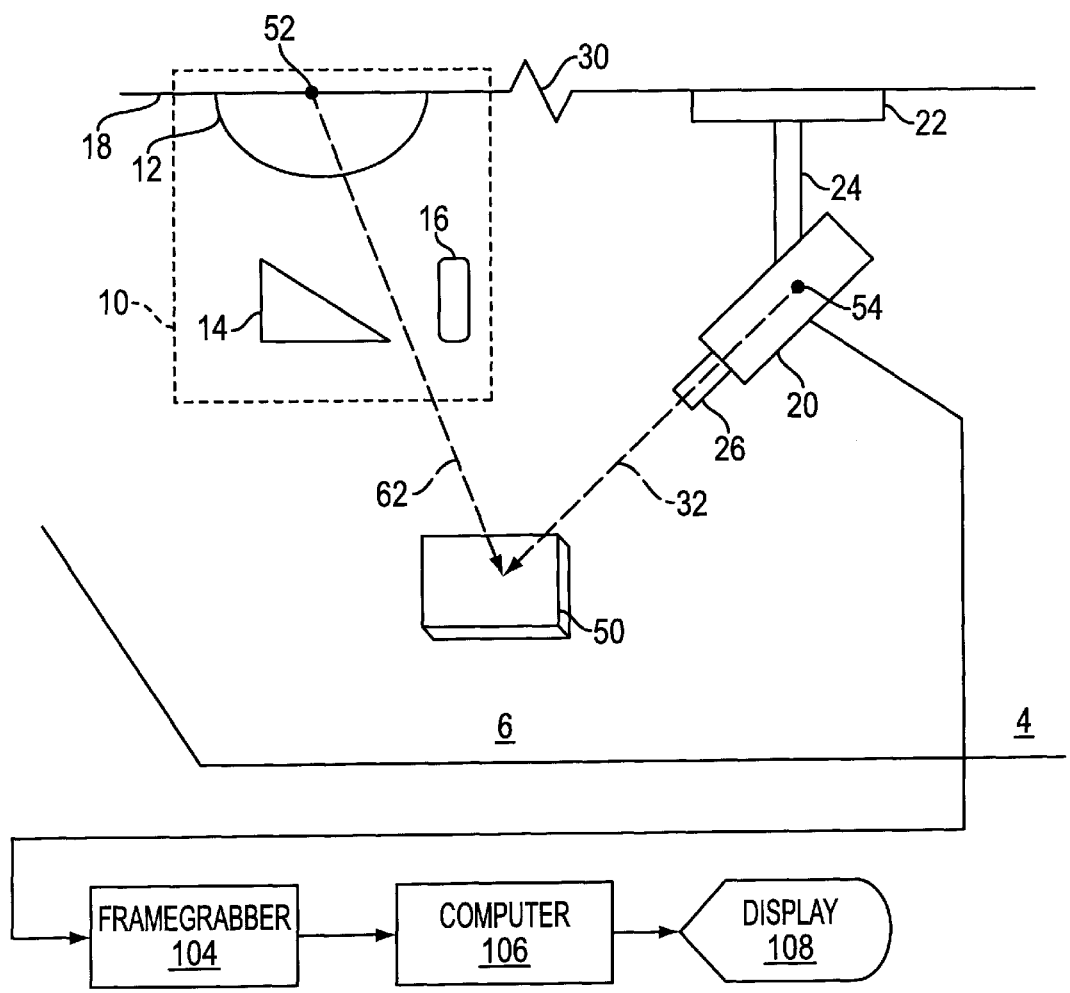
FIG. 4A is a diagram of geometric relationships among elements of the optical systems of FIG. 1.
Figure 4B:
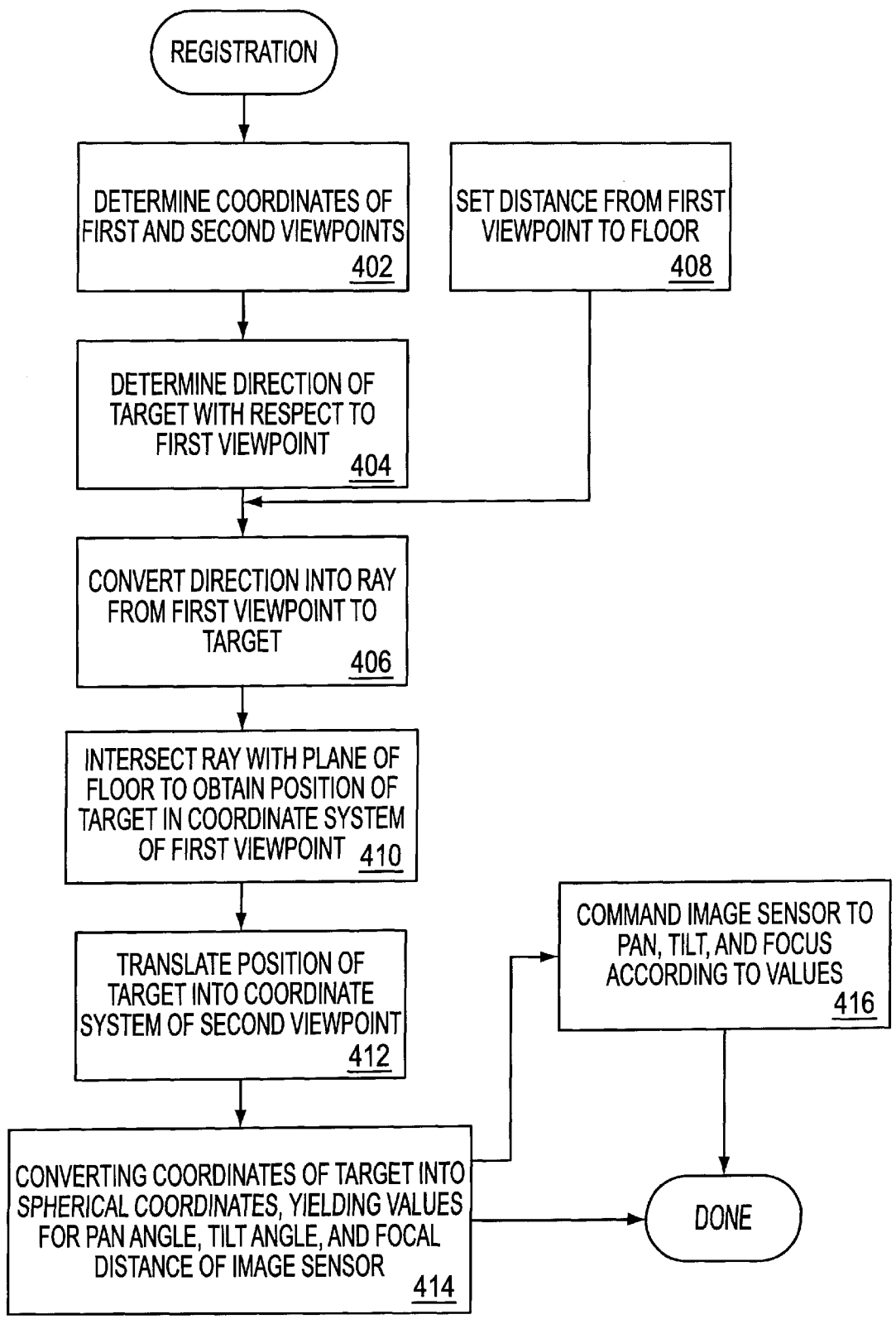
FIG. 4B is a flow diagram of a first embodiment of a method of moving an image sensor from a first position to a second position.

FIG. 4A is a diagram of the embodiment of FIG. 1, additionally showing a target 50 within the area of interest 4. The image sensor 20 is positioned to directly view the target 50 without the aid of the wide-angle optical system 10. Thus, the target 50 can be viewed from two distinct viewpoints. A first viewpoint 52 is that of the wide-angle optical system 10, coincident with the focal point of the mirror 12. A second viewpoint 54 is that of the image sensor 20. In one embodiment, the registration mechanism is implemented in one or more computer programs or programmatic objects, executed by the computer system 106, that carry out steps of a process shown in the flow diagram of FIG. 4B.

As shown in step 402, in an initialization or calibration process, the relative positions of the viewpoints 52, 54 are specified or may be determined. For example, the relative positions of the viewpoints may be directly measured and recorded at the time the equipment is installed. In step 404, the direction of the target 50 with respect to viewpoint 52 is determined or specified. Depending on the configuration of the computer system 106, steps 402 and 404 may involve various user input steps and coordinate transformation steps. For example, assume that the display 108 is showing an image from the image sensor 20 and reflected from the wide-angle optical system 10. The user identifies the target 50 on the display 108. For example, using a pointing device of the computer system 106, the user moves a cursor generated by the computer system over the target 50, and presses a button on the pointing device. In response, an application program running in the computer system 106 records values of two-dimensional Cartesian coordinates that represent the position of the cursor at the time the button was pressed. The coordinates represent a point within the target 50. Accounting for the size of the target 50 will be described below.

The direction of the target with respect to viewpoint 52 may be unambiguously converted to a ray 62 from the viewpoint 52 to the target 50, as shown in step 406. However, the distance of the target 50 from the viewpoint 52 is still ambiguous. The target 50 could be anywhere along the ray. Therefore, information about the ray 62 is insufficient to supply values needed to control the image sensor 20 to produce a direct image of the target 50.

One method of determining the needed values is to assume that the target 50 lies on the plane of the floor 6 of the area of interest 4. At initialization time, or at the time the equipment is installed, the distance of the wide view optical system 10 to the floor 6 is established, as shown in step 408. The ray from viewpoint 52 to the target 50 is intersected with the plane of the floor 6 to obtain the point at which the target 50 is located, as shown in step 410. Values for the angular or relative pan and tilt positions of the image sensor 20 are determined by translating the position of the target 50 into coordinates within a reference frame originating at the camera viewpoint 54, as shown in step 412. Converting the Cartesian coordinates into spherical coordinates yields values for the pan and tilt angles and the focal distance of the image sensor 20, as shown in step 414.

Immediately or at a later time, as shown in step 416, the image sensor is commanded to move to the position indicated by the values of the pan angle, tilt angle, and focal distance. In this way, an operator can smoothly select an object from the wide-angle display and cause the image sensor to rapidly locate the object in a direct view.

The plane of the floor 6 is used in this example, but in fact any plane may be used, as long as it does not contain the viewpoint 52. Also, the user can indicate the size of the target 50 by specifying more than one point for the location of the target 50. For example, the user clicks on multiple points located around the perimeter of the object. Each such point is used to generate a set of spherical coordinates about the camera viewpoint 54, using the same process described above. The zoom lens 26 of the image sensor 20 is set to contain an angle subtended by the coordinates.

Further, in alternate embodiments, other mechanisms for selecting the target are used. For example, a motion detector is coupled to the computer system 106. The computer system receives input from the motion detector when the motion detector detects motion of a target. The computer system converts the location of the target in the motion detector's field of detection into a set of target coordinates in one of the coordinate systems. In other alternate embodiments, other means for sensing a target area are provided, for example, a proximity sensor, an infrared sensor, a detector based on radar, and a visible light detector.

Figure 5A:
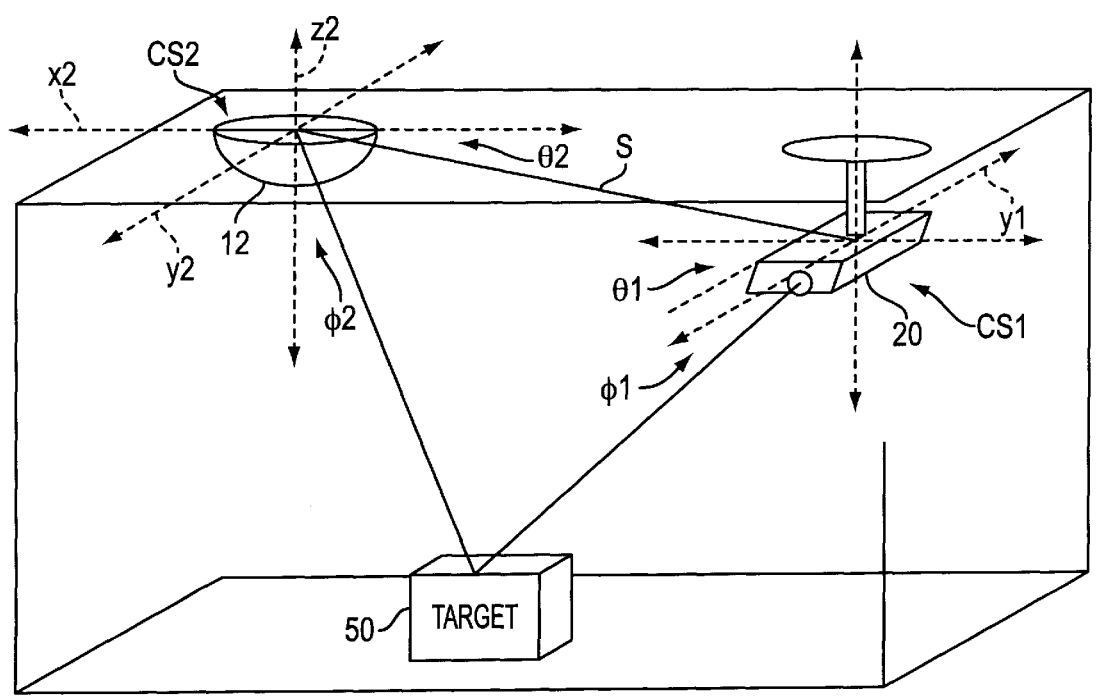
FIG. 5A is perspective view of geometric relationships among elements of the optical systems of FIG. 1, FIG. 2, and FIG. 3A.
Figure 5B:
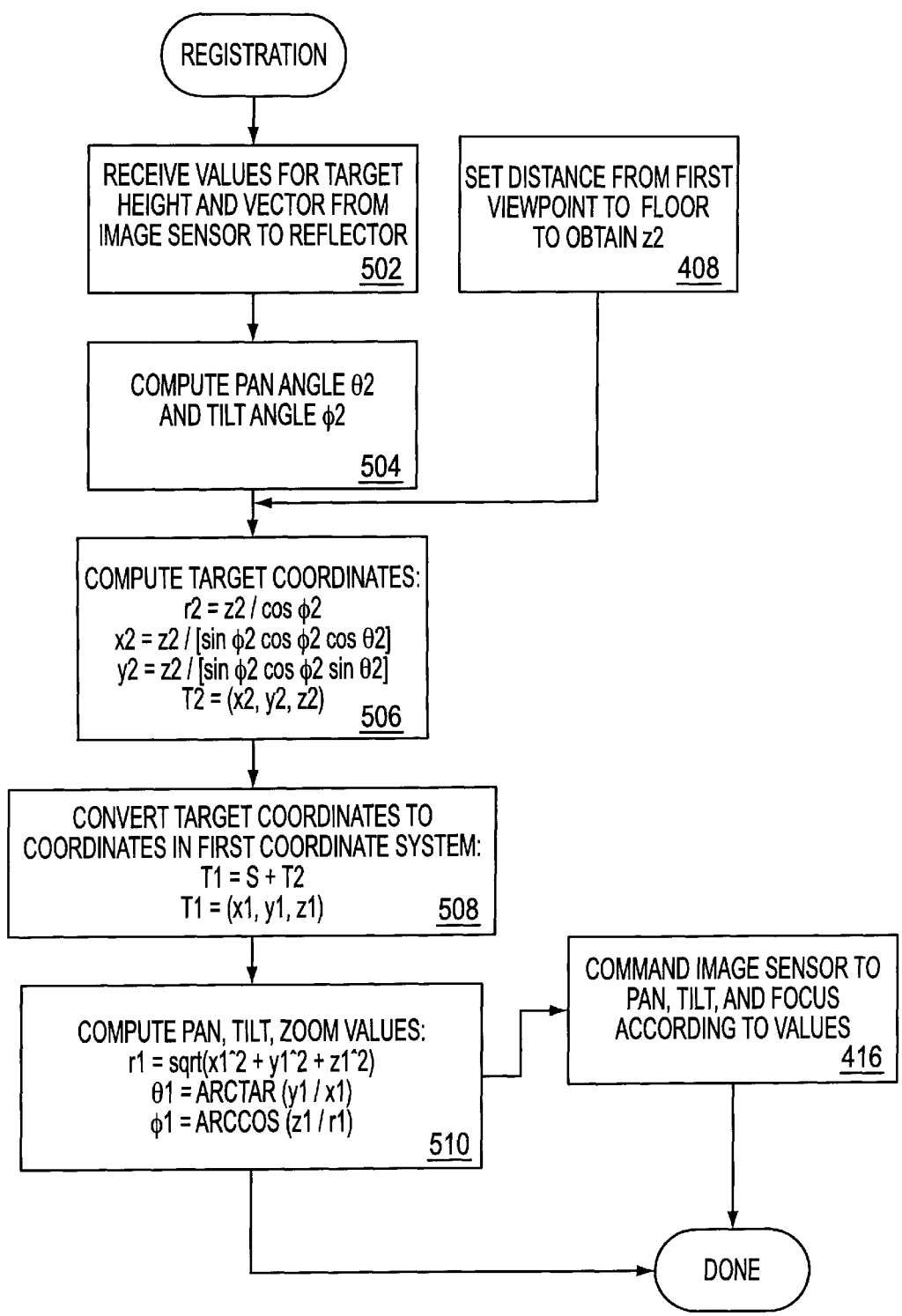
FIG. 5B is a flow diagram of a second embodiment of a method of moving an image sensor from a first position to a second position.

FIG. 5A is a perspective view of the embodiment of FIG. 4A, showing angular relationships and coordinate relationships in additional detail. FIG. 5B is a flow diagram showing an alternate method of registration. The method of FIG. 5B involves a transformation from a coordinate system CS2 of the wide-angle optical system 10, having its origin at the viewpoint 52, to a coordinate system CS1 or the image sensor 20, having its origin at the viewpoint 54.

The target 50 is assumed to lie in a known horizontal plane, so that its height with respect to the two coordinate systems CS1, CS2 is $z_1$, $z_2$, respectively. In addition, in CS1, the position of the viewpoint 52 is known to be vector S. In step 502, the target height values and the values of vector S are received. For example, the values are set as constants in a computer program running on the computer system 106 that implements the method of FIG. 5B. Alternatively, the values are entered and saved in a persistent data storage device when the system is installed.

The pan angle $\theta_2$ and the tilt angle $\phi_2$ are obtained, as shown in step 504, when the user selects a target in the image. The values $\theta_2$ and $\phi_2$ are the pan angle and tilt angle, respectively, for the target 50 with respect to the wide angle optical system. The pan angle $\theta_2$ and tilt angle $\phi_2$ define the direction of a vector from the focus of the paraboloid mirror 12 to the chosen point on the target. In the case when the user selects a point on the target by selecting a point on a computer display that is showing the wide angle image, the pan angle $\theta_2$ and tilt angle $\phi_2$ are obtained by mapping x and y coordinates of the point in the image to spherical coordinates about the viewpoint 52. For the case of a parabolic mirror, this may be achieved using the following mapping:

$$\tan \theta_2 = (y/X)$$

$$r = \sqrt{x^2 + y^2}$$

$$z = (h^2 - r^2)/2h$$

$$\tan \phi_2 = (z/r)$$

As indicated above, the height of the target in CS2 is known. We let the height of the floor with respect to CS2 by $Z_2$; it is typically negative in value. To determine its other coordinates $x_2$, $Y_2$, the following procedure is used. As shown in step 506, spherical to Cartesian coordinate conversions are carried out:

$$r_2 = z_2/\cos \phi_2$$

$$x_2 = z_2/[\sin \phi_2 \cos \phi_2 \cos \theta_2]$$

$$y_2 = z_2/[\sin \phi_2 \cos \phi_2 \sin \theta_2]$$

The location of the target then can be expressed in CS2 coordinates:

$$T_2 = (x_2, y_2, z_2)$$

To convert to CS1 coordinates, it is known that $$T_1 = S + T_2$$

where S is the vector from viewpoint 54 to viewpoint 52. Accordingly, as shown in step 508, $$T_1 = (x_1, y_1, z_1)$$

It remains to determine the spherical coordinates of this point in CS1, which are $$r_1 = \sqrt{x_1^2 + y_1^2 + z_1^2}$$

$$\theta_1 = \tan^{-1}(y_1/x_1)$$

$$\phi_1 = \cos^{-1}(z_1/r_1)$$

These values are the zoom, pan and tilt values for the adjustable image sensor, respectively.

The foregoing is one example of a means for causing the image sensor to obtain a direct view that includes a target. An alternative strategy for obtaining the direct view uses control systems integral to typical commercially available PTZ camera systems. Some PTZ camera systems that are commercially available now can store one or more preset camera positions, commonly called "presets". Each preset has a unique identifier, such as a number. Each preset is a persistently stored set of values that represent a camera position, such as a pan value, tilt value, and zoom value. A preset is stored by commanding the camera to move to a particular position, and then issuing a "preset save" command or the equivalent. In response to the preset save command, the camera system records, in persistent data storage, values reflecting the then-current pan position, tilt position, and zoom position. At some later time, the user may command the system to move to a particular preset. In response, the camera system computes the amount of movement needed to move from its current pan, tilt, and zoom positions to new positions that correspond to the preset values. The camera system then executes a move to those positions.

In the alternative registration strategy, a set of presets are created that define camera positions which, taken together, entirely cover the area of interest. The camera is then moved, using another preset, to a position directed at the wide-angle optical system, so that a wide-angle view is obtained. When a particular target is seen in the wide-angle view, the camera is commanded to move to one of the preset narrower views by selecting the preset having position values which result in the best view of the target.

In a variant of the alternative strategy, each of the presets is established using a relatively wide zoom setting of the zoom lens. The set of presets is created in such a way that their union covers the entire wide field of view. After the target is captured in the narrower view using one of the presets, the user may manually zoom in, if desired.

Depending on the application, substantially more elaborate schemes for eliminating ambiguity in the distance of targets may be envisioned. These include, for example, tables of distances of fixed objects in the field of view, and hints based on knowledge of objects, occlusion and relative size. For example, if an object is recognized as a person, and persons are known in general to measure about six feet tall, and the object's size in the image is visible, then the distance of the person from a viewpoint of the image can be inferred using appropriate mathematics and geometry.

COMPUTER SYSTEM HARDWARE OVERVIEW

Figure 6:
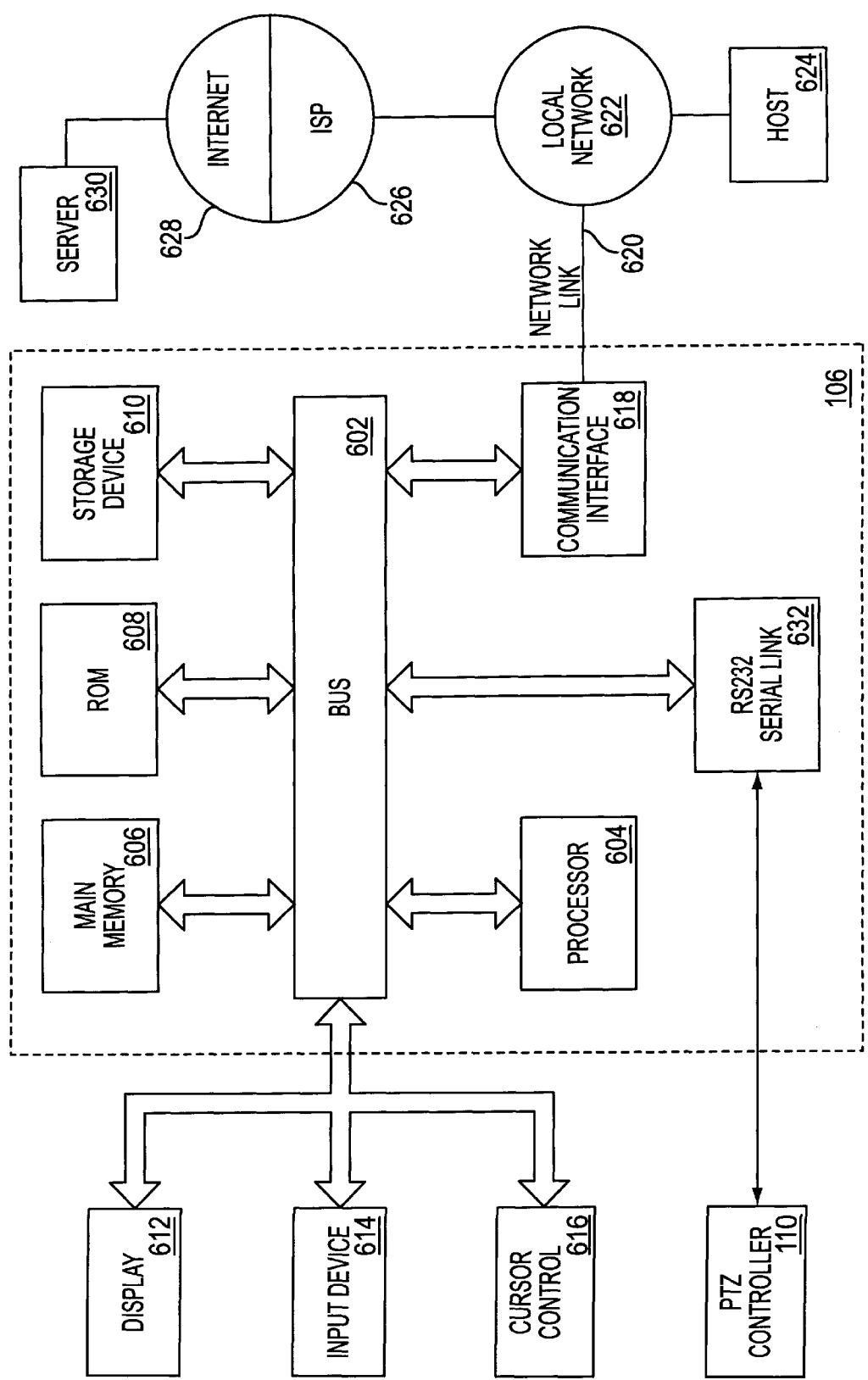
FIG. 6 is a diagram of a computer system that can be used to carry out certain computations related to the embodiments of FIG. 4B and FIG. 5B.

FIG. 6 is a block diagram that illustrates a computer system 106 upon which an embodiment of the invention may be implemented. Computer system 106 includes a bus 602 or other communication mechanism for communicating information, and a processor 604 coupled with bus 602 for processing information. Computer system 106 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 106 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 106 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 106 for registering an image from one coordinate system to another. According to one embodiment of the invention, registering an image from one coordinate system to another is provided by computer system 106 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 106 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 106 also includes a communication interface 618 coupled to bus 602. Communication interface 618 provides a two-way data communication coupling to a network link 620 that is connected to a local network 622.

For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world-wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 106, are exemplary forms of carrier waves transporting the information.

Computer system 106 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for registering an image from one coordinate system to another as described herein.

The received code may be executed by processor 604 as it is received, and/or stored in storage device 610, or other non-volatile storage for later execution. In this manner, computer system 106 may obtain application code in the form of a carrier wave.

The computer system 106 also has an RS232 serial link 632 or interface coupled to the bus 602. The RS232 serial link 632 provides an input/output interface for data communicated using the IEEE RS232 protocol to the PTZ Controller 110. Under control of a stored program, the RS232 serial link can be read or written by the processor 604 to communicate data from a storage device or main memory to the PTZ Controller 110.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What claimed is:

1. An optical system that provides a wide field of view and a direct field of view of an area of interest, said optical system comprising:
    a wide-angle optical system that reflects electromagnetic radiation from the wide field of view in the area of interest;
    an image sensor that can sense the radiation and generate a signal representing a visible image from the radiation;
    means for redirecting radiation; and
    means for moving the image sensor to a first position in which the image sensor receives the redirected radiation and forms a wide field of view image of the area of interest, and for moving the image sensor to a second position facing away from the wide-angle optical system and the means for redirecting radiation and forms a direct field of view image.

2. The optical system in accordance with claim 1, in which the wide-angle optical system provides a substantially hemispherical field of view of the area of interest.

3. The optical system in accordance with claim 1, in which the wide-angle optical system comprises a curved mirror.

4. The optical system in accordance with claim 3, in which the curved mirror is formed with a partial quadric surface.

5. The optical system in accordance with claim 3, in which the curved mirror is a spherical mirror.

6. The optical system in accordance with claim 3, in which the curved mirror is a parabolic mirror.

7. The optical system in accordance with claim 3, in which the curved mirror is a hyperbolic mirror.

8. The optical system in accordance with claim 3, in which the curved mirror is an elliptical mirror.

9. The optical system in accordance with claim 1 in which the wide-angle optical system comprises a plurality of planar mirrors.

10. The optical system in accordance with claim 1, in which said wide-angle optical system comprises a faceted surface, and in which each facet of the faceted surface is a mirror.

11. The optical system in accordance with claim 1, in which the wide-angle optical system comprises a faceted surface, and in which each facet of the faceted surface is a curved mirror.

12. The optical system in accordance with claim 1, in which the wide-angle optical system comprises a curved mirror and a second mirror aligned to receive radiation reflected from the curved mirror and to direct the reflected radiation to the image sensor.

13. The optical system in accordance with claim 12, wherein the curved mirror is a paraboloid mirror having a curved outer surface that substantially obeys the equation $z=(h^2-r^2)/2h$, where z is an axis of rotation, r is a radial coordinate, and h is twice the focal length of the paraboloid mirror.

14. The optical system in accordance with claim 1, in which the wide-angle optical system comprises a curved mirror, and in which the means for redirecting radiation comprises a planar mirror aligned to receive radiation reflected from the curved mirror and to direct the reflected radiation to the image sensor.

15. The optical system in accordance with claim 1, in which the means for redirecting radiation comprises one or more reflecting surfaces.

16. The optical system in accordance with claim 1, in which the means for redirecting radiation comprises one or more refracting surfaces.

17. The optical system in accordance with claim 1, in which the means for redirecting radiation comprises one or more optical fibers.

18. The optical system recited in claim 1, wherein the image sensor and the means for moving the image sensor comprises a pan-tilt-zoom (PTZ) camera.

19. The optical system in accordance with claim 1, in which the means for redirecting radiation comprises a relay lens axially aligned with a zoom lens.

20. The optical system recited in claim 1, in which the image sensor is aligned, when in the first position, to receive the radiation along an imaging axis that is substantially coincident with an optical axis of the wide-angle optical system.

21. The optical system recited in claim 1, further comprising:
    means for selecting a target area in the wide field of view image of the area of interest; and
    means for causing the image sensor to obtain a direct view that includes the target area.

22. The optical system recited in claim 1, further comprising:
    a selection device selecting a target area in the wide field of view image of the area of interest; and
    an image control mechanism controlling the image sensor to obtain a direct view including the target area.

23. An optical system that provides a wide field of view and a direct field of view of an area of interest, comprising:
    a wide-angle optical system that reflects electromagnetic radiation from the wide field of view in the area of interest;
    a camera that can sense the radiation and generate a signal representing a visible image from the radiation, in which the camera is movable to pan, tilt, and zoom from a first position in which the camera receives the radiation reflected from the wide-angle optical system and forms a wide field of view image of the area of interest, and a second position directed away from the wide-angle optical system in which the image sensor receives radiation directly from the area of interest and forms a direct field of view image.

24. The optical system of claim 23, in which the wide-angle optical system comprises a parabolic reflector.

25. The optical system of claim 24, in which the wide-angle optical system further comprises a relay lens for directing the reflected radiation from the parabolic reflector to the camera.

26. The optical system of claim 25, in which the camera further comprises a zoom lens that cooperates with the relay lens to cause the reflected radiation to be telecentric when the camera is in the first position.

27. An optical system that provides a wide field of view and a direct field of view of an area of interest, comprising:
    a wide-angle optical system that reflects at least one image from the wide field of view in the area of interest;
    a camera that receives the at least one image from said wide-angle optical system and generates a signal responsive thereto, wherein said camera is movable to pan, tilt, and zoom from a first position in which the camera receives the at least one image reflected from the wide-angle optical system and forms a wide field of view image of the area of interest, and a second position directed away from the wide-angle optical system in which said camera receives at least one other image directly from the area of interest and forms a direct field of view image therefrom.

28. An optical system that provides a wide field of view and a direct field of view of an area of interest, comprising:
    a wide-angle optical or mirror system that reflects at least one image from the wide field of view in the area of interest;
    an image acquisition device that receives the at least one image from said wide-angle optical or mirror system and generates a signal responsive thereto, wherein said image acquisition device is movable to pan, tilt, and zoom from a first position in which the image acquisition device receives the at least one image reflected from the wide-angle optical or acquisition system and forms a wide field of view image of the area of interest, and a second position directed away from the wide-angle optical or mirror system in which said image acquisition device receives at least one other image directly from the area of interest and forms a direct field of view image therefrom.

29. A method of providing a wide field of view and a direct field of view of an area of interest using an optical system, comprising the steps of:
    (a) reflecting at least one image from the wide field of view in the area of interest using a wide-angle optical or mirror system; and
    (b) controlling the alternate performance of:
        (1) receiving the at least one image and generating a signal responsive thereto using an image acquisition device movable to pan, tilt, and zoom, forming a wide field of view image of the area of interest, and
        (2) receiving at least one other image directly from the area of interest using the image acquisition device without the use of the wide-angle optical or mirror system, forming a direct field of view image therefrom.

30. A method according to claim 29, wherein said controlling step (b) is perfomed remotely from the image acquisition device.

31. A method according to claim 29, wherein said controlling step (b) is perfomed remotely from the image acquisition device via at least one of a local area network or a public network.

32. A method according to claim 29, wherein said controlling step (b) is perfomed remotely from the image acquisition device via at least one of a local area network or a public network including the Internet.

33. An optical system that provides a wide field of view and a direct field of view of an area of interest, said optical system comprising:
    a wide-angle optical system that reflects electromagnetic radiation from the wide field of view in the area of interest;
    an image sensor that can sense the radiation and generate a signal representing a visible image from the radiation;
    means for moving the image sensor to a first position in which the image sensor receives the radiation reflected from the wide-angle optical system and forms a wide field of view image of the area of interest, and for moving the image sensor to a second position facing away from the wide-angle optical system and forms a direct field of view images
    one or more processors; and
    a memory coupled to the one or more processors, the memory having stored therein sequences of instructions which, when executed by the one or more processors, cause the one or more processors to move the image sensor from the first position to the second position by causing the processor to perform the steps of:
        (A) determining first coordinates of a first viewpoint associated with the wide field of view image, second coordinates of a second viewpoint associated with the direct field of view image, and direction of a target in a first coordinate system associated with the first viewpoint;
        (B) converting the direction into a ray extending from the first viewpoint to the target;

(C) computing an intersection of the ray with values describing a reference plane on which the target lies to obtain third coordinates of the target with respect to a first coordinate system that is associated with the first viewpoint;

(D) translating the third coordinates into a second coordinate system that is associated with the second viewpoint, using the intersection computed in said step (C) to obtain fourth coordinates; and (E) converting the fourth coordinates into a pan angle value, a tilt angle value, and a focal distance value representing the second position.

34. The optical system recited in claim 33, in which the sequences of instructions further cause the one or more processors to carry out the step of (F) commanding the image sensor to move from the first position to the second position according to the pan angle value, tilt angle value, and focal distance value.

35. An optical system that provides a wide field of view and a direct field of view of an area of interest, comprising:

a wide-angle optical system that reflects electromagnetic radiation from the wide field of view in the area of interest;

an image sensor that can sense the radiation and generate a signal representing a visible image from the radiation; and means for moving the image sensor to a first position in which the image sensor receives the radiation reflected from the wide-angle optical system and forms a wide field of view image of the area of interest, and for moving the image sensor to a second position facing away from the wide-angle optical system in which the image sensor receives radiation from the area of interest and forms a direct field of view image, one or more processors; and a memory coupled to the one or more processors, the memory having stored therein sequences of instructions which, when executed by the one or more processors, cause the one or more processors to move the image sensor from the first position to the second position by causing the processor to perform the steps of:

(A) receiving a target height value $z_2$ and a vector S directed from a viewpoint associated with the direct field of view image to a second viewpoint associated with the wide field of view image, wherein the first viewpoint and the second viewpoint is respectively associated with a first coordinate system and a second coordinate system;

(B) computing a pan angle $\theta_2$ and a tilt angle $\phi_2$;

(C) computing a vectors $T_2$ of target coordinates ($x_2$, $y_2$, $z_2$) in the second coordinate system associated with the second viewpoint by computing the equations $r_2 = z_2 / \cos \phi_2$ $x_2 = z_2 / [\sin \phi_2 \cos \phi_2 \cos \phi_2]$ $y_2 = z_2 / [\sin \phi_2 \cos \phi_2 \sin \phi_2]$;

(D) converting the vector $T_2$ of target coordinates to a vector $T_1$ of target coordinates in the first coordinate system by computing the equations $T_1 = S + T_2$ $T_1 = (x_1, y_1, z_1)$;

(E) computing a focus value, a pan value, and a tilt value for the image sensor, by computing the equations $r_1 = \sqrt{x_1^2 + y_1^2 + z_1^2}$ $\phi_1 = \tan^{-1}(y_1/x_1)$ $\phi_1 = \cos^{-1}(z_1/r_1)$ and (F) moving the image sensor from the first position to the second position using the focus value, pan value, and tilt value.

36. An optical system that provides a wide field of view and a direct field of view of an area of interest, said optical system comprising:

a wide-angle optical system that reflects electromagnetic radiation from the wide field of view in the area of interest;

an image sensor that can sense the radiation and generate a signal representing a visible image from the radiation;

means for moving the image sensor to a first position in which the image sensor receives the radiation reflected from the wide-angle optical system and forms a wide field of view image of the area of interest, and for moving the image sensor to a second position facing away from the wide-angle optical system and forms a direct field of view images one or more processors;

a memory coupled to the one or more processors, the memory having stored therein:

a plurality of presets, each of the presets comprising information describing a pre-defined position of the image sensor that provides a direct view of the area of interest; and sequences of instructions which, when executed by the one or more processors, cause the one or more processors to move the image sensor from the first position to the second position by causing the processor to perform the steps of:

(A) determining first coordinates of a first viewpoint associated with the wide field of view image, second coordinates of a second viewpoint associated with the direct field of view image, and direction of a target in a first coordinate system associated with the first viewpoint;

(B) converting the direction into a ray extending from the first viewpoint to the target;

(C) computing an intersection of the ray with values describing a reference plane on which the target lies to obtain third coordinates of the target with respect to a first coordinate system that is associated with the first viewpoint;

(D) translating the third coordinates into a second coordinate system that is associated with the second viewpoint, using the intersection computed in said step (C) to obtain fourth coordinates; and (E) selecting one of the plurality of presets that provides a direct view of a region of the area of interest that includes the fourth coordinates.

37. The optical system recited in claim 36, wherein the sequences of instructions further comprises instructions that cause the processor carry out the step of (F) commanding the image sensor to move to the preset select in step (E).

38. The optical system recited in claim 36, wherein the plurality of presets collectively defines direct views of the entire area of interest.

39. The optical system recited in claim 36, wherein each of the presets comprises values representing a pan position, tilt position, and zoom position of the image sensor.

40. An optical system that provides a wide field of view and a direct field of view of an area of interest, said optical system comprising:
- a wide-angle optical system that reflects electromagnetic radiation from the wide field of view in the area of interest;
- an image sensor that can sense the radiation and generate a signal representing a visible image from the radiation;
- means for moving the image sensor to a first position in which the image sensor receives the radiation reflected from the wide-angle optical system and forms a wide field of view image of the area of interest, and for moving the image sensor to a second position facing away from the wide-angle optical system and forms a direct field of view image; and
- a computer-readable medium carrying sequences of instructions which, when executed by one or more processors, cause the one or more processors to move the image sensor from the first position to the second position by causing the processor to perform the steps off:
  - (A) determining first coordinates of a first viewpoint associated with the wide field of view image, second coordinates of a second viewpoint associated with the direct field of view image, and direction of a target in a first coordinate system associated with the first viewpoint;
  - (B) converting the direction into a ray extending from the first viewpoint to the target;
  - (C) computing an intersection of the ray with values describing a reference plane on which the target lies to obtain third coordinates of the target with respect to a first coordinate system that is associated with the first viewpoint;
  - (D) translating the third coordinates into a second coordinate system that is associated with the second viewpoint, using the intersection computed in said step (C) to obtain fourth coordinates; and
  - (E) converting the fourth coordinates into a pan angle value, a tilt angle value, and a focal distance value representing the second position.

41. The optical system recited in claim 40, in which the sequences of instructions further cause the one or more processors to carry out the step of (F) commanding the image sensor to move from the first position to the second position according to the pan angle value, tilt angle value, and focal distance value.

42. An optical system that provides a wide field of view and a direct field of view of an area of interest, said optical system comprising:
- a wide-angle optical system that reflects electromagnetic radiation from the wide field of view in the area of interest;
- an image sensor that can sense the radiation and generate a signal representing a visible image from the radiation;
- means for moving the image sensor to a first position in which the image sensor receives the radiation reflected from the wide-angle optical system and forms a wide field of view image of the area of interest, and for moving the image sensor to a second position facing away from the wide-angle optical system and forms a direct field of view image;
- a computer-readable medium carrying sequences of instructions which, when executed by one or more processors, cause the one or more processors to move the image sensor from the first position to the second position by causing the processor to perform the steps of:
  - (A) determining first coordinates of a first viewpoint associated with the wide field of view image, second coordinates of a second viewpoint associated with the direct field of view image, and direction of a target in a first coordinate system associated with the first viewpoint;
  - (B) converting the direction into a ray extending from the first viewpoint to the target;
  - (C) computing an intersection of the ray with values describing a reference plane on which the target lies to obtain third coordinates of the target with respect to a first coordinate system that is associated with the first viewpoint;
  - (D) translating the third coordinates into a second coordinate system that is associated with the second viewpoint, using the intersection computed in said step (C) to obtain fourth coordinates; and
  - (E) converting the fourth coordinates into a pan angle value, a tilt angle value, and a focal distance value representing the second position.

43. The optical system recited in claim 42, wherein the sequences of instructions further comprise instructions that cause the processor to carry out the step of (F) commanding the image sensor to move to the preset selected in step (E).

44. The optical system recited in claim 42, wherein the plurality of presets collectively defines direct views of the entire area of interest.

45. The optical system recited in claim 42, wherein each of the presets comprises values representing a pan position, tilt position, and zoom position of the image sensor.

46. An optical system that provides a wide field of view and a direct field of view of an area of interest, said optical system comprising:
- a wide-angle optical system that reflects electromagnetic radiation from the wide field of view in the area of interest;
- a camera that can sense the radiation and generate a signal representing a visible image from the radiation, in which the camera is movable to pan, tilt, and zoom from a first position in which the camera receives the radiation reflected from the wide-angle optical system and forms a wide field of view image of the area of interest, and a second position directed away from the wide-angle optical system and forms a direct field of view image; and
- a computer-readable medium carrying sequences of instructions which, when executed by one or more processors, cause the one or more processors to move the image sensor from the first position to the second position by causing the processor to perform the steps of:
  - (A) determining first coordinates of a first viewpoint associated with the wide field of view image, second coordinates of a second viewpoint associated with the direct field of view image, and direction of a target in a first coordinate system associated with the first viewpoint;
  - (B) converting the direction into a ray extending from the first viewpoint to the target;
  - (C) computing an intersection of the ray with values describing a reference plane on which the target lies to obtain third coordinates of the target with respect to a first coordinate system that is associated with the first viewpoint;
  - (D) translating the third coordinates into a second coordinate system that is associated with the second viewpoint, using the intersection computed in said step (C) to obtain fourth coordinates; and (E) converting the fourth coordinates into a pan angle value, a tilt angle value, and a focal distance value representing the second position.

47. The optical system recited in claim 46, in which the sequences of instructions further cause the one or more processors to carry out the step of (F) commanding the camera to move from the first position to the second position according to the pan angle value, tilt angle value, and focal distance value.

48. An optical system that provides a wide field of view and a direct field of view of an area of interest, said optical system comprising:
- a wide-angle optical system that reflects electromagnetic radiation from the wide field of view in the area of interest;
- a camera that can sense the radiation and generate a signal representing a visible image from the radiation, in which the camera is movable to pan, tilt, and zoom from a first position in which the camera receives the radiation reflected from the wide-angle optical system and forms a wide field of view image of the area of interest, and a second position directed away from the wide-angle optical system and forms a direct field of view image;
- a computer-readable medium having stored therein:
  - a plurality of presets, each of the presets comprising information describing a pre-defined position of the camera that provides a direct view of the area of interest; and
  - sequences of instructions which, when executed by one or more processors, cause the one or more processors to move the camera from the first position to the second position by causing the processor to perform the steps of:
    - (A) determining first coordinates of a first viewpoint associated with the wide field of view image, second coordinates of a second viewpoint associated with the direct field of view image, and direction of a target in a first coordinate system associated with the first viewpoint;
    - (B) converting the direction into a ray extending from the first viewpoint to the target;
    - (C) computing an intersection of the ray with values describing a reference plane on which the target lies to obtain third coordinates of the target with respect to a respect to a first coordinate system that is associated with the first viewpoint;
    - (D) translating the third coordinates into a second coordinate system that is associated with the second viewpoint, using the intersection computed in said step (C) to obtain fourth coordinates; and
    - (E) selecting one of the plurality of presets that provides a direct view of a region of the area of interest that includes the fourth coordinates.

49. The optical system recited in claim 48, wherein the sequences of instructions further comprise instructions that cause the processor to carry out the step of (F) commanding the camera to move to the preset selected in step (E).

50. The optical system recited in claim 48, wherein the plurality of presets collectively defines direct views of the entire area of interest.

51. The optical system recited in claim 48, wherein each of the presets comprises values representing a pan position, tilt position, and zoom position of the camera.

52. An optical system that provides a wide field of view and a direct field of view of an area of interest, comprising:
- a wide-angle optical system that reflects electromagnetic radiation from the wide field of view in the area of interest;
- an image sensor that can sense the radiation and generate a signal representing a visible image from the radiation; and
- a mount having a first and a second position for moving the image sensor to a first position in which the image sensor receives the radiation reflected from the wide-angle optical system and forms a wide field of view image of the area of interest, and for moving the image sensor to a second position facing away from the wide-angle optical system in which the image sensor receives radiation from the area of interest and forms a direct field of view image.

* * * * *